(12) United States Patent
Chen et al.

(10) Patent No.: US 8,791,928 B2
(45) Date of Patent: *Jul. 29, 2014

(54) PIXEL DRIVING METHOD, PIXEL DRIVING DEVICE AND LIQUID CRYSTAL DISPLAY USING THEREOF

(75) Inventors: Po-Yang Chen, Tao-Yuan Hsien (TW); Po-Sheng Shih, Tao-Yuan Hsien (TW); Tsu-Chiang Chang, Tao-Yuan Hsien (TW)

(73) Assignee: Hannstar Display Corp. (TW)

( * ) Notice: Subject to any disclaimer, the term of this patent is extended or adjusted under 35 U.S.C. 154(b) by 1241 days.

This patent is subject to a terminal disclaimer.

(21) Appl. No.: 11/935,463

(22) Filed: Nov. 6, 2007

(65) Prior Publication Data
US 2009/0115750 A1    May 7, 2009

(51) Int. Cl.
| | | |
|---|---|---|
| *G09G 5/00* | (2006.01) | |
| *G06F 3/044* | (2006.01) | |
| *G06F 3/041* | (2006.01) | |
| G02F 1/1333 | (2006.01) | |
| G09G 3/20 | (2006.01) | |
| G09G 3/36 | (2006.01) | |
| G02F 1/1362 | (2006.01) | |

(52) U.S. Cl.
CPC .............. *G06F 3/0412* (2013.01); *G06F 3/044* (2013.01); *G02F 1/13338* (2013.01); *G09G 3/2011* (2013.01); *G09G 3/3655* (2013.01); *G02F 1/136286* (2013.01)
USPC ................ 345/204; 345/38; 345/55; 345/690

(58) Field of Classification Search
USPC ....................................... 345/204, 38, 55, 690
See application file for complete search history.

(56) References Cited

U.S. PATENT DOCUMENTS

| | | | |
|---|---|---|---|
| 7,084,849 B2 * | 8/2006 | Noguchi et al. ................. | 345/96 |
| 2003/0076289 A1 * | 4/2003 | Tokonami et al. ............. | 345/100 |
| 2007/0046567 A1 * | 3/2007 | Ha .................. | 345/38 |
| 2007/0070013 A1 * | 3/2007 | Chen et al. ...................... | 345/94 |
| 2010/0059296 A9 * | 3/2010 | Abileah et al. ............. | 178/18.09 |

* cited by examiner

*Primary Examiner* — William Boddie
*Assistant Examiner* — Leonid Shapiro
(74) *Attorney, Agent, or Firm* — Volpe and Koenig, P.C.

(57) ABSTRACT

The present invention provides a pixel driving method for a liquid crystal display. The pixel includes a storage capacitor and a liquid crystal capacitor. The pixel driving method includes steps of: providing a common voltage signal to a liquid crystal capacitor, and providing a bias signal to a storage capacitor wherein the bias signal is synchronized with the common voltage signal and the amplitude of the bias signal is larger than that of the common voltage signal.

22 Claims, 10 Drawing Sheets

PIXEL DRIVING METHOD, PIXEL DRIVING DEVICE AND LIQUID CRYSTAL DISPLAY USING THEREOF

FIELD OF THE INVENTION

The present invention relates to a pixel driving method and a liquid crystal display using thereof, and more particularly to a LCD panel with a capacitor voltage modulating function.

BACKGROUND OF THE INVENTION

LCD panels, especially small and middle LCD panels, S/M LCD panels, for mobile and multimedia applications, are being developed ambitiously. To meet the demands of high-end mobile devices including functions such as cellular phone, digital camera, music player, GPS, mobile TV and so on, the development of S/M LCD panels with higher resolution, higher image quality, low power consumption and cost competitiveness is inevitable.

Please refer to FIG. 1(a), $V_{com}$ modulation is widely applied in S/M LCD panels. The driving of $V_{com}$ modulation can reduce the output voltage range of a source driver so as to save the source driver cost. However, it still causes the gray level inconsistent and then leads to the flick and the low transmittance when the TFT of a pixel unit is turned off and common voltage changes. This problem is attributed to the charge distribution on the pixel unit, which is disturbed by the voltage change of $V_{com}$. To avoid the gray level being inconsistent, a storage capacitor $C_{st}$ is configured in the common structure. That is, the $C_{st}$ of the pixel unit on common structure is comprised of a common line and a pixel electrode disposed on a array substrate, wherein the common line and the common electrode are connected to the same voltage source, so that both the voltages of the common line and the common electrode are modulated to balance the charge distribution in the pixel unit.

Please refer to FIG. 1(b), which illustrates the layout of the storage capacitor $C_{st}$ on common structure. The pixel unit 1 includes data lines 11 & 12, gate lines 13 & 14, a TFT 15, a common line 16, and a pixel electrode 17. The pixel electrode 17 covers the common line 16 to form the $C_{st}$, as shown the cross-section view along the dotted line a to a'. The $V_{com}$ modulation requires the $C_{st}$ on common structure to avoid the gray level inconsistency when the TFT turns off and common voltage changes.

However, if a pixel includes some significant parasitic capacitances, although it has the $C_{st}$ on common structure, the gray level also appears to be inconsistent. On the other word, the storage capacitor $C_{st}$ in the common structure doesn't solve this problem completely. In many high-end applications such as HAR design, In-Cell Touch panel and so on, the significant parasitic capacitance is indispensable.

Please refer to FIG. 2, which is a circuit diagram showing a pixel unit of an In-Cell Touch panel according to the prior art. Touch sensors or photo sensors (not shown) are regularly disposed in the cell of the In-Cell touch panel. Moreover, readout lines connected to the sensors transmit the touch signals to a readout circuit. The pixel unit 2 includes a TFT 20, a liquid crystal capacitor $C_{LC}$, and a storage capacitor $C_{ST}$. The G(Gate) electrode of TFT 10 is electrically connected to the gate line Gate$_n$, the D(Drain) electrode is electrically connected to the data line Data$_m$, and the S(Source) electrode is electrically connected to one end of respective the liquid crystal capacitor $C_{LC}$ and the storage capacitor $C_{ST}$. The other ends of respective the liquid crystal capacitor $C_{LC}$ and the storage capacitor $C_{ST}$ are connected to the common voltage source. Owing to the existence of the read-out line of an In-Cell touch panel for In-Cell touch signal, a parasitic capacitor $C_{read-out}$ is formed in the pixel unit as FIG. 2 shows. For example, the parasitic capacitor $C_{read-out}$ formed between the pixel electrode and the readout line leads to the inconsistent gray level when the TFT 20 is turned off and $V_{com}$ changes.

Either the In-Cell touch panel or the HAR designed panel meet significant parasitic capacitance causing gray level inconsistent. Please refer to FIG. 3, which is a schematic diagram showing the structure of a high aperture ratio (HAR) pixel unit according to the prior art. The HAR pixel unit 3 includes a pixel electrode 30, a first data line 31, a second data line 32, a first gate line 33, and a second gate line 24. The pixel electrode 30 is designed to partially cover the adjacent data lines 31 & 32 and gate lines 33 & 34 so that the black matrix (BM)(not shown) widths are shrunk, therefore the high aperture ratio is increased, as FIG. 3 shows. It is noted that the capacitance formed between the pixel electrode 20 and the data line 31 is $C_{d1}$, the capacitance formed between the pixel electrode 30 and the data line 32 is $C_{d2}$, the capacitance formed between the pixel electrode 30 and the gate line 33 is $C_{g1}$, and the capacitance formed between the pixel electrode 30 and the gate line 34 is $C_{g2}$. The cross-section view along the dotted line a to a' is, for example, also shown in FIG. 3.

As FIG. 3 shows, the capacitance formed between the pixel electrode 30 and the gate line 33 due to the partial covering thereof is $C_{g1}$. The area generated from the pixel electrode 30 covering the gate line 33 leads to one of the aforementioned parasitic capacitance, which causes the inconsistent gray level when the TFT 35 (shown in FIG. 2) of the pixel unit 3 is turned off and $V_{com}$ changes.

Please refer to FIG. 3(a), which is an equivalent circuit diagram showing the structure of the HAR pixel unit according to FIG. 3. The HAR pixel unit 3 includes a TFT 30, a liquid crystal capacitor $C_{lc}$, a storage capacitor $C_{st}$, a Gate line 1, a Gate line 2, a Data line 1, and a Data line 2. The G(gate) electrode of the TFT 30 is electrically connected to the Gate line 1, the D(drain) electrode of the TFT 30 is electrically connected to the Data line 1, and the S(source) electrode of the TFT 30 is electrically connected to one end of the liquid crystal capacitor $C_{lc}$ and one end of the storage capacitor $C_{st}$. The other end of the storage capacitor $C_{st}$ is connected to the common line and that of the liquid crystal capacitor $C_{lc}$ is connected to the common electrode of a color filter (CF) (not shown). Both the common line and the common electrode are electrically connected to a common voltage source. Similarly, the capacitance formed between the pixel electrode and the Data line 1 is $C_{d1}$, the capacitance formed between the pixel electrode and the Data line 2 is $C_{d2}$, the capacitance formed between the pixel electrode and the Gate line 1 is $C_{g1}$, and the capacitance formed between the pixel electrode and the Gate line 2 is $C_{g2}$. One ends of $C_{d2}$, $C_{d1}$, $C_{g2}$, $C_{g1}$, $C_{st}$, and $C_{LC}$ are all electrically connected to a node P, and the node P electrode connected to the S(source) electrode of the TFT 30. That is, the total parasitic capacitance, $C_b$, of the HAR pixel unit 3 is comprised of $C_{d1}$, $C_{d2}$, $C_{g1}$, and $C_{g2}$. That is, $$C_b = C_{g1} + C_{g2} + C_{d1} + C_{d2}$$

Please refer to FIG. 3(b), which is a waveform diagram showing the waveforms of the $V_{com}$ signal and the Gate signal of the HAR pixel unit in FIG. 3(a) according to the prior art. The waveform above shows the waveforms of the $V_{com}$ signal and the Gate signal in the even frame and the waveform below shows those in the odd frame. During the periods of gate signal impulses, the TFT becomes conductive between S(source) terminal and D(drain) terminal because of the inversion layer in the amorphous silicon layer induced by gate signal impulses, and the voltage at node P in FIG. 3(a) is charged and discharged to the data signal voltages in the even frame and in the odd frame respectively. After the gate signal impulses, the TFT becomes isolated between S(source) terminal and D(drain) terminal because the low gate voltage dispels the inversion layer in the amorphous silicon layer. Therefore, the pixel electrode becomes floating and the voltage at the node P is synchronously varied with the $V_{com}$ signal. Because the parasitic capacitances exist, the change quantity ($\Delta V_p$) of node P voltage shown in the black horizontal line is smaller than that ($\Delta V_{com}$) of $V_{com}$ modulated voltage, which causes the voltage difference between the node P and common voltage source is not fixed, leading to the transmittance loss and gray level inconsistent. That is, with the existence of the total parasitic capacitance $C_b$, the peak $\Delta V_p$ is always smaller than the $\Delta V_{com}$. Since the total parasitic capacitance $C_b$ shares the charge pumped by the Vcom voltage in the pixel electrode, the gray level of the HAR pixel unit 3 thus becomes inconsistent. The traditional method to solve this problem is to enlarge the size of the storage capacitor $C_{st}$. However, the aperture ratio will be decreased undesirably.

Similarly, FIG. 3(b) also showing the waveform of the In-Cell touch panel, and please refer to FIG. 2 which is an equivalent circuit diagram showing the pixel structure of the In-Cell touch panel. The In-Cell touch panel pixel 2 includes a TFT 20, a liquid crystal capacitor $C_{lc}$, a storage capacitor $C_{st}$, a Gate line n, a Gate line n−1, a Data line n, and a readout line. The G(gate) electrode of the TFT 20 is electrically connected to the Gate line n, the D(drain) electrode of the TFT 20 is electrically connected to the Data line n, and the S((source) electrode of the TFT 20 is electrically connected to one end of liquid crystal capacitor $C_{lc}$ and that of the storage capacitor $C_{st}$. The other end of the storage capacitor $C_{st}$ is connected to the common line and that of the crystal capacitor $C_{lc}$ is connected to the common electrode of a color filter (CF) (not shown). Both the common line and the common electrode are electrically connected to a common voltage source. In the In-Cell touch panel, there is a readout capacitor $C_{read-out}$, a parasitic capacitance caused by readout line, of which one end is electrically connected to the S(source) electrode of the TFT 20, and the other end of the $C_{read-out}$ is connected to the readout line. The one end of $C_{read-out}$, $C_{st}$, and $C_{LC}$ are all electrically connected to a node P, and the node P electrode connected to the S(source) electrode of the TFT 20. Therefore, the main parasitic capacitance in the pixel structure of the In-Cell touch panel is $C_{read-out}$.

Please refer to FIG. 3(b), which is a waveform diagram showing the waveforms of the $V_{com}$ signal and the Gate signal of the In-Cell touch panel pixel unit in FIG. 2 according to the prior art. The waveform above shows the waveforms of the $V_{com}$ signal and the Gate signal in the even frame and the waveform below shows those in the odd frame. During the periods of gate signal impulses, the TFT 20 becomes conductive between S(source) terminal and D(drain) terminal because of the inversion layer in the amorphous silicon layer induced by gate signal impulses, and the node P in FIG. 2 is charged and discharged to the data signal voltages in the even frame and in the odd frame respectively.

After the gate signal impulses, the TFT 20 becomes isolated between S(source) terminal and D(drain) terminal because the low gate voltage dispels the inversion layer in the amorphous silicon layer. Therefore, the pixel electrode becomes floating and the voltage at the node P is synchronously varied With the $V_{com}$ signal. Because the parasitic capacitances exist, the change quantity ($\Delta V_p$) of node P voltage shown in the black horizontal line is smaller than that ($\Delta V_{com}$) of $V_{com}$ modulated voltage, which causes the voltage difference between the node P and common voltage source is not fixed, leading to the transmittance loss and gray level inconsistent. That is, with the existence of the total parasitic capacitance $C_{read-out}$, the peak $\Delta V_p$ is always smaller than the $\Delta V_{com}$. Since the total parasitic capacitance $C_{read-out}$ shares the charge pumped by the $V_{com}$ voltage in the pixel electrode, the gray level of the In-Cell touch panel thus becomes inconsistent.

SUMMARY OF THE INVENTION

According to the foregoing object of the present invention, a pixel driving method for a liquid crystal display is provided. The pixel includes a storage capacitor and a liquid crystal capacitor. The pixel driving method includes steps of: providing a common voltage signal to a liquid crystal capacitor, and providing a bias signal to a storage capacitor. The bias signal is synchronized with the common voltage signal and the amplitude of the bias signal is larger than that of the common voltage signal.

According to the foregoing object of the present invention, a liquid crystal display including a plurality of pixels is provided. Each of the pixel includes a storage capacitor having a first terminal connected electrically to a bias signal and a second terminal, and a liquid crystal capacitor having a first terminal connected electrically to the second terminal of the storage capacitor and a second terminal connected electrically to a common voltage signal. The bias signal is synchronized with the common voltage signal and an amplitude of the bias signal is larger than that of the common voltage signal.

According to the foregoing object of the present invention, a pixel driving device for a liquid crystal display is provided. The pixel includes a storage capacitor and a liquid crystal capacitor. The pixel driving device includes means for providing a common voltage signal to the liquid crystal capacitor, and means for providing a bias signal to the storage capacitor. The bias signal is synchronized with the common voltage signal and an amplitude of the bias signal is larger than that of the common voltage signal.

According to the foregoing object of the present invention, a liquid crystal display including a plurality of pixels is provided. Each of the pixel includes a storage capacitor having a first terminal connected electrically to a bias signal and a second terminal, a first capacitor having a first terminal connected electrically to a first line and a second terminal, and a liquid crystal capacitor having a first terminal connected electrically to the second terminal of the storage capacitor and the third capacitor, and a second terminal connected electrically to a common voltage signal. The bias signal is synchronized with the common voltage signal and amplitude of the bias signal is larger than that of the common voltage signal.

Preferably, the liquid crystal display is an In-Cell Touch panel.

Preferably, the liquid crystal display is a high aperture ratio (HAR) pixel panel.

Preferably, the pixel further includes a switching element having a control terminal connected electrically to a first gate line, a first terminal connected electrically to a first data line, and a second terminal connected electrically to the storage capacitor and the liquid crystal capacitor.

Preferably, there is a capacitor between a pixel electrode and a readout line.

Preferably, there is an overlap portion between a pixel electrode and a readout line.

Preferably, there is an overlap portion between a pixel electrode and the gate line and the data line.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 4:
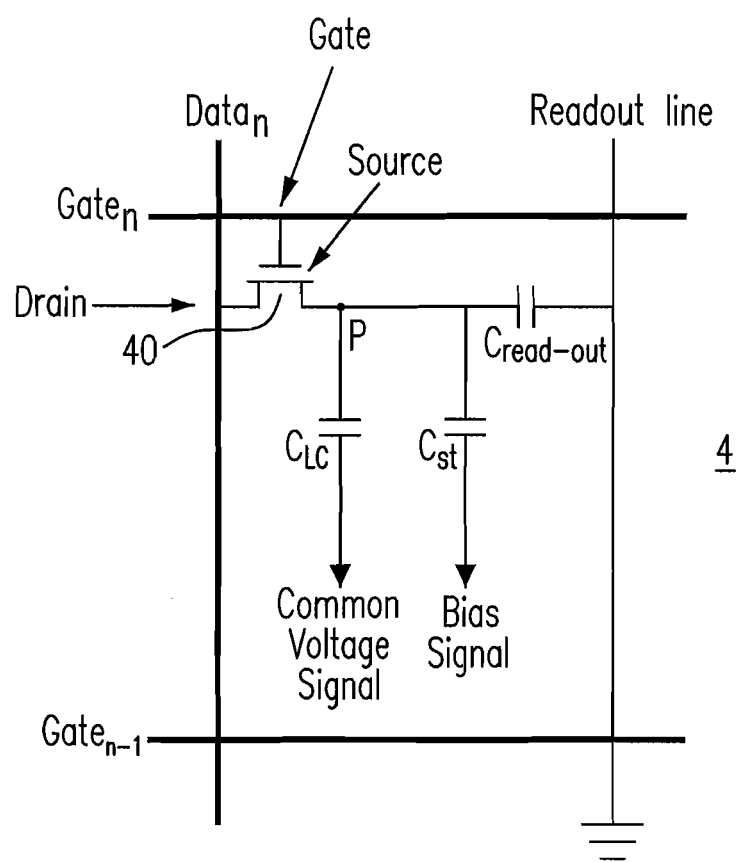
FIG. 4 is a circuit diagram showing a pixel unit of an In-Cell Touch panel according to one embodiment of the present invention.

Please refer to FIG. 4, which is a circuit diagram showing a pixel unit of an In-Cell Touch panel according to one embodiment of the present invention. The pixel unit 4 includes a TFT 40, a liquid crystal capacitor $C_{LC}$, whose structure is comprised of a pixel electrode and a common electrode of a color filter (not shown) to sandwich a liquid crystal layer, and a storage capacitor $C_{ST}$. The TFT 40 is electrically connected to the first gate line Gate$_n$ with its Gate terminal, electrically connected to the first data line Data$_m$ with its Drain terminal, and electrically connected to the pixel electrode of the liquid crystal capacitor $C_{LC}$ and the first terminal of the storage capacitor $C_{ST}$ with its Source terminal. A parasitic capacitor $C_{read-out}$ is further electrically connected between the pixel electrode and the read-out line.

According to the pixel driving method of the present invention, instead of the common voltage source electrically connected to the liquid crystal capacitor $C_{LC}$ and the storage capacitor $C_{st}$, a common voltage source, which supplies a common voltage signal, electrically connected to the liquid crystal capacitor $C_{LC}$, and a bias voltage source, which supplies a bias voltage signal, electrically connected to the first terminal of the storage capacitor $C_{ST}$.

Figure 6:
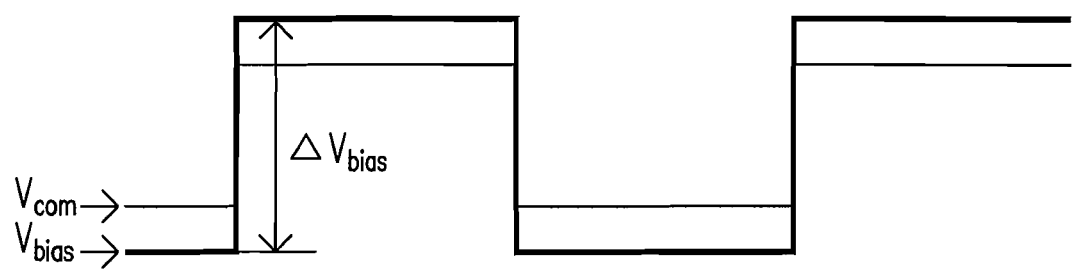
FIG. 6 is a waveform diagram showing the bias signal and the common voltage signal of the HAR pixel unit 5 in FIG. 5.

Please refer to FIG. 6, which is a waveform diagram showing the bias signal and the common voltage signal of an In-Cell Touch panel pixel unit in FIG. 4. It is clear from FIG. 6 that the bias signal is synchronized with the common voltage signal, and the amplitude of the bias signal is larger than that of the common voltage signal. Therefore, the $\Delta V_p$ can be determined by the following equation.

$$\Delta V_p = [(C_{LC})/(C_{st}+C_{LC}+C_{read-out})] \cdot \Delta V_{com} + [(C_{st})/(C_{st}+C_{LC}+C_{read-out})] \cdot \Delta V_{bias}$$

It is expected that $\Delta V_p = \Delta V_{com}$, we can obtain $$\Delta V_{bias} = [(C_{st}+C_{read-out})/C_{st}] \cdot \Delta V_{com}$$

It is apparent that $\Delta V_{bias}$ is independent on the liquid crystal capacitor $C_{LC}$. That is, the specific amplitude of the bias signal is independent on the varied capacitance of the liquid crystal capacitor $C_{LC}$, which means the compensation adopted in the present invention is always consistent at any gray levels. Therefore, with this implementation, the inconsistent gray level can be avoided.

Figure 1A:
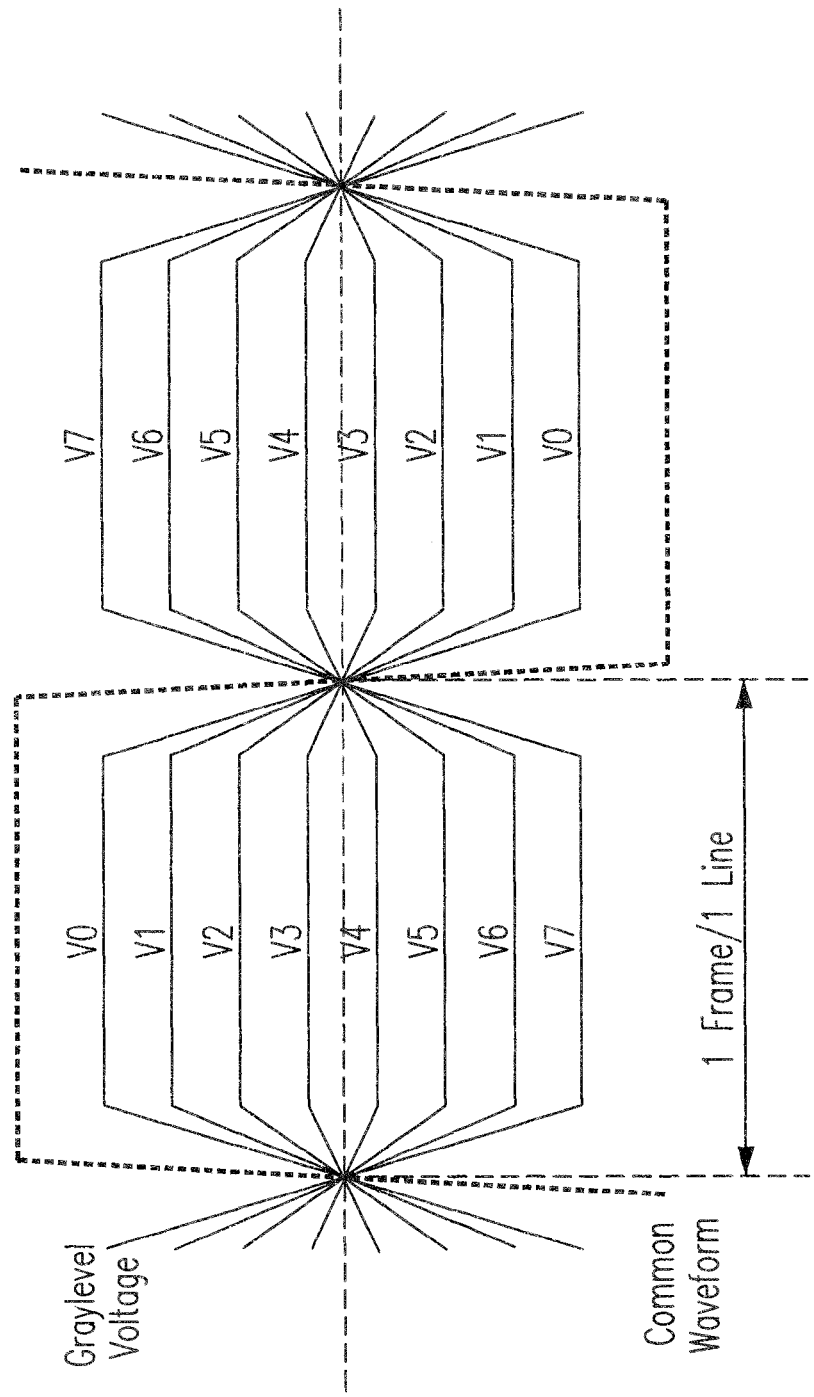
FIG. 1(a) is a diagram showing a $V_{com}$ modulation driving curve according to the prior art.
Figure 1B:
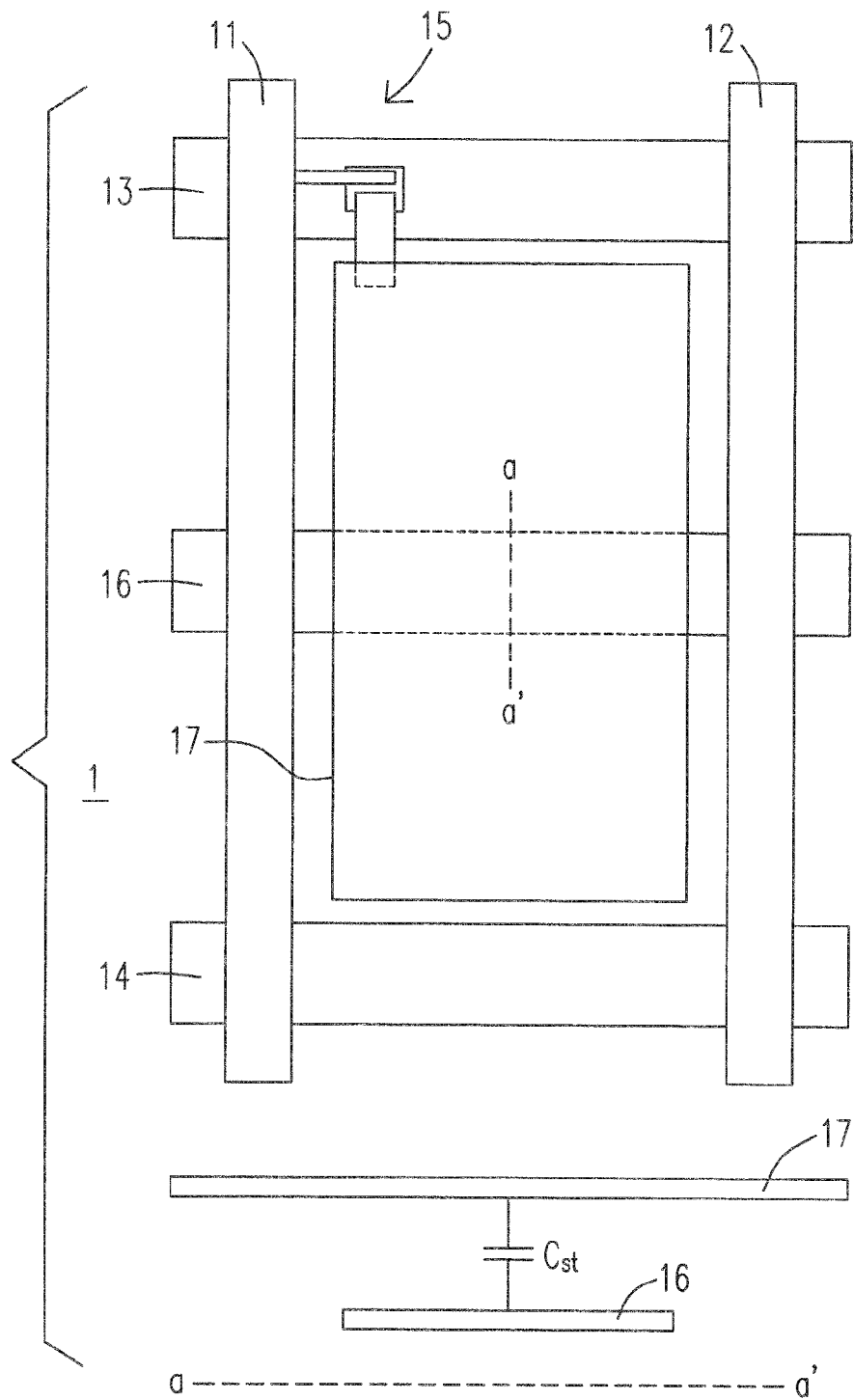
FIG. 1(b) is a schematic diagram showing the structure of the layout of the Cst on common structure according to the prior art.
Figure 2:
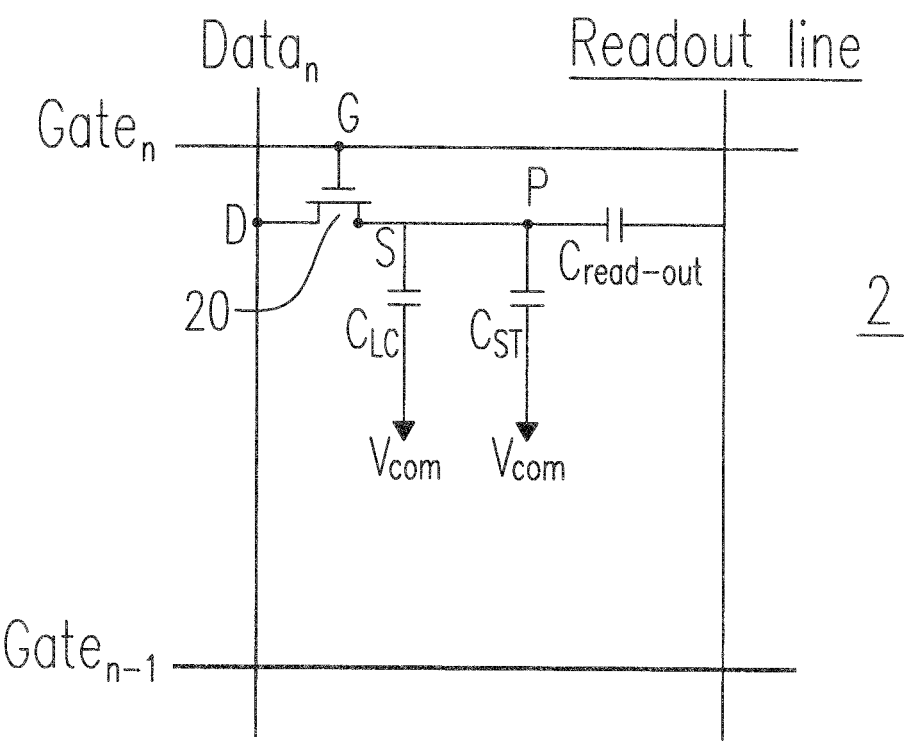
FIG. 2 is a circuit diagram showing a pixel unit of a In-Cell Touch panel according to the prior art.
Figure 3:
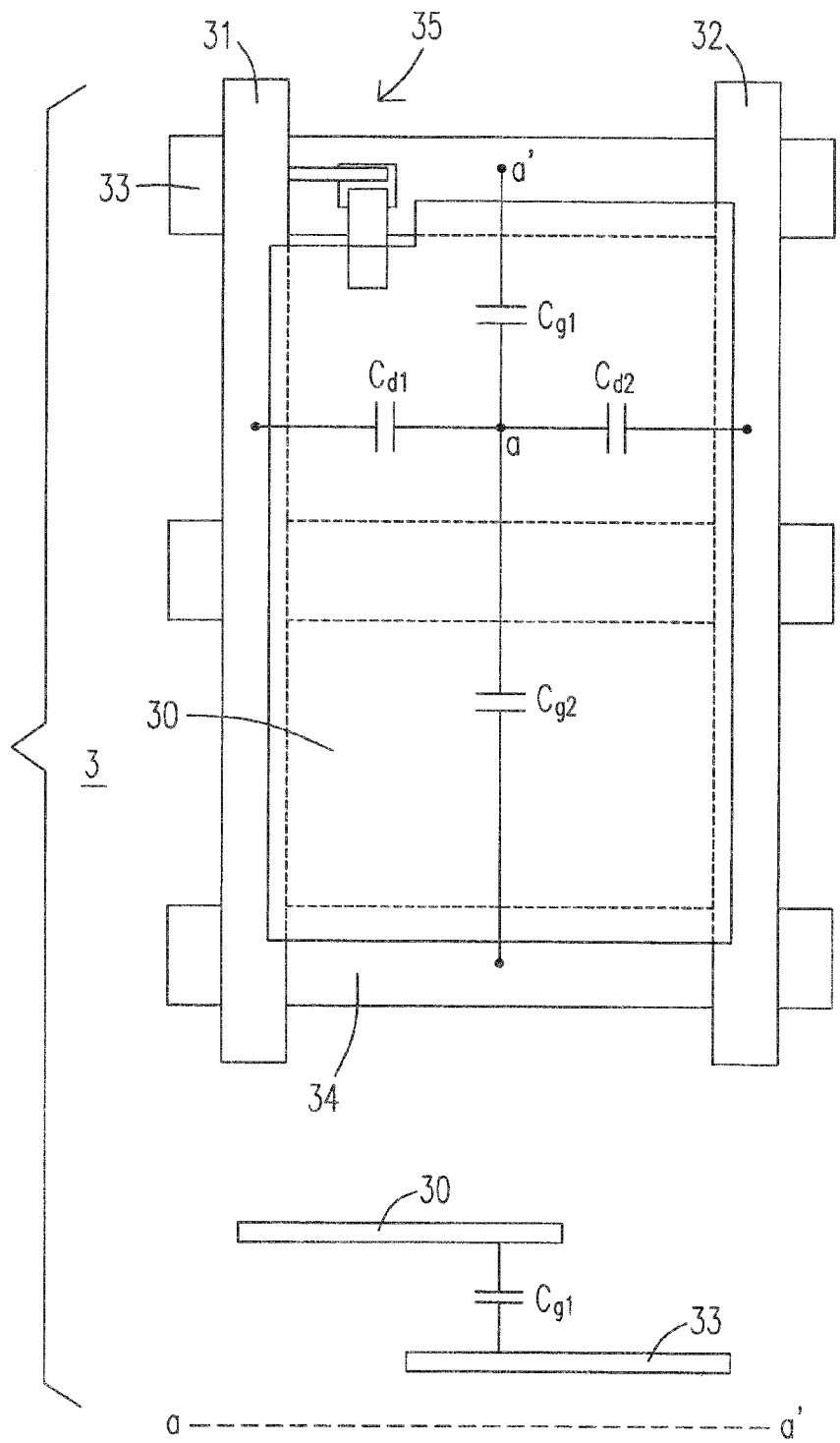
FIG. 3 is a schematic diagram showing the structure of a high aperture ratio (HAR) pixel unit according to the prior art.
Figure 3A:
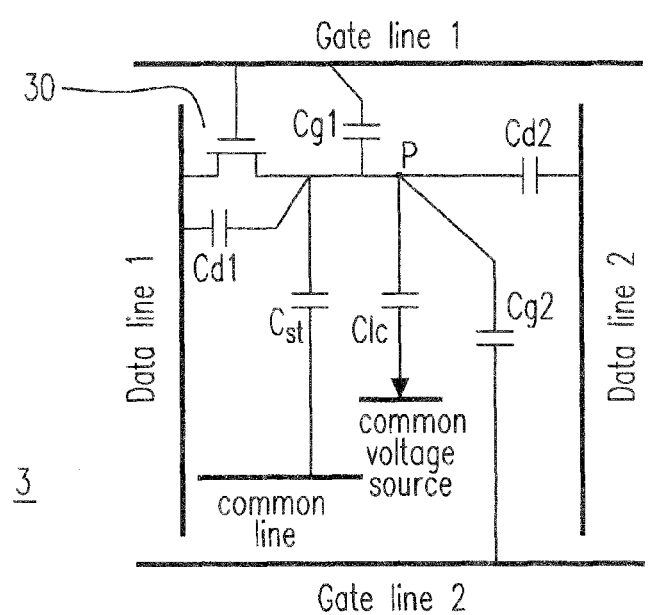
FIG. 3(a) is a circuit diagram showing the structure of another HAR pixel unit according to the prior art.
Figure 3B:
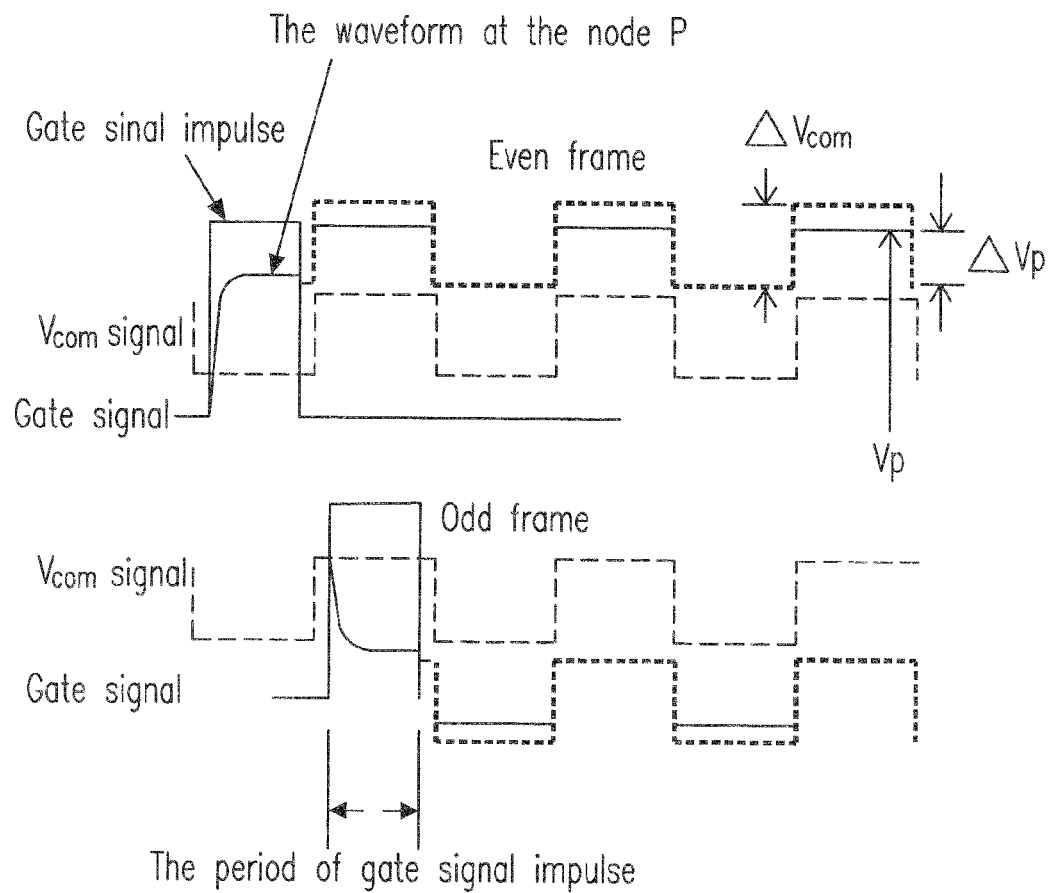
FIG. 3(b) is a waveform diagram showing the waveforms of the Vcom signal and the Gate signal of the HAR pixel unit in FIG. 3(a) according to the prior art.

Similarly, the same pixel driving method can also be applied to the structure of the high aperture ratio (HAR) pixel unit 3 shown in FIG. 3, where there exists at least one overlap portion between the pixel electrode and the gate lines 33 & 34 and the data lines 31 & 32 to cause the above-mentioned effects.

Figure 5:
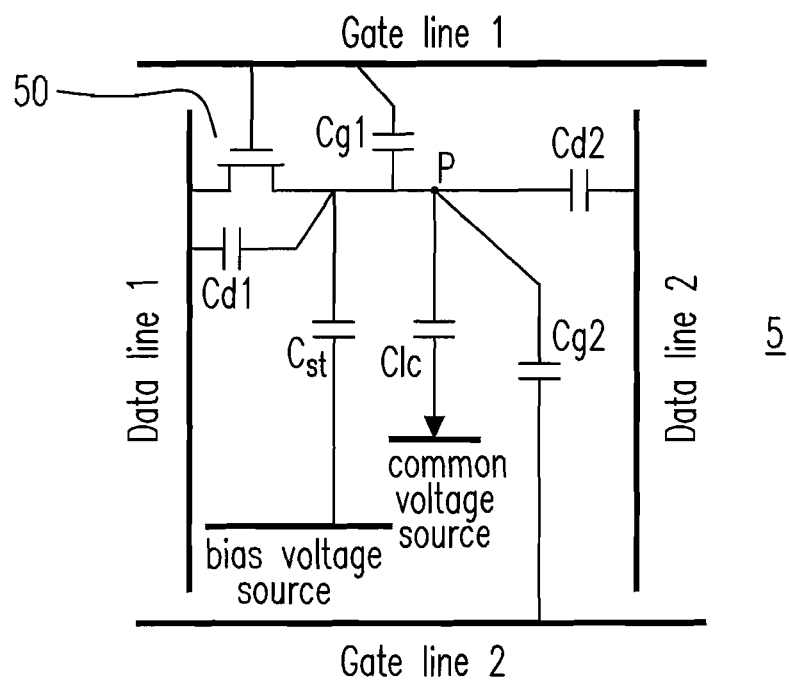
FIG. 5 is a circuit diagram showing the structure of a HAR pixel unit according to the present invention.

Please refer to FIG. 5, which is a circuit diagram showing the structure of a HAR pixel unit according to the present invention. The HAR pixel unit 5 includes a TFT 50, a liquid crystal capacitor $C_{lc}$, a storage capacitor $C_{st}$, a Gate line 1, a Gate line 2, a Data line 1, and a Data line 2. The TFT 50 is electrically connected to the Gate line 1, the Data line 1, and one end of the liquid crystal capacitor $C_{LC}$ and the storage capacitor $C_{st}$.

According to the pixel driving method of the present invention, instead of the common voltage source, which supplies a common voltage signal, and connected to the storage capacitor $C_{st}$, the other end of the storage capacitor $C_{st}$ is connected to a Bias voltage source for obtaining a bias signal and that of the liquid crystal capacitor $C_{lc}$ is connected to the common voltage source for obtaining a common voltage signal. Besides, similar to the prior art, the capacitance formed between the pixel electrode and the Data line 1 is $C_{d1}$, the capacitance formed between the pixel electrode and the Data line 2 is $C_{d2}$, the capacitance formed between the pixel electrode and the Gate line 1 is $C_{g1}$, and the capacitance formed between the pixel electrode and the Gate line 2 is $C_{g2}$. That is, the total parasitic capacitance, $C_b$, of the HAR pixel unit 5 is comprised of $C_{d1}$, $C_{d2}$, $C_{g1}$, and $C_{g2}$.

Please refer to FIG. 6, which is a waveform diagram showing the bias signal and the common voltage signal of the HAR pixel unit 5 in FIG. 5. It is clear from FIG. 6 that the bias signal is synchronized with the common voltage signal, and the amplitude of the bias signal is larger than that of the common voltage signal. The present pixel driving method is given in detail as follows.

The total parasitic capacitance, $C_b$, of the HAR pixel unit 5 is comprised of $C_{d1}$, $C_{d2}$, $C_{g1}$, and $C_{g2}$. Therefore, the total parasitic capacitance of $C_b$ can be determined by the following equation.

$$C_b = C_{d1} + C_{d2} + C_{g1} + C_{g2} \tag{3}$$

Base on the conservation of charge, it can be deduced that the relation between $\Delta V_p$, the change quantity of node P voltage, and $\Delta V_{com}$, the change quantity of modulated $V_{com}$ voltage. The $\Delta V_p$ can be determined by the following equation.

$$\Delta V_p = [(C_{lc})/(C_{st}+C_{lc}+C_b)] \cdot \Delta V_{com} + [(C_{st})/(C_{st}+C_{lc}+C_b)] \cdot \Delta V_{bias} \tag{4}$$

It is expected that $\Delta V_p = \Delta V_{com}$, so we can obtain $$\Delta V_{bias} = [(C_{st} + C_b)/C_{st}] \cdot \Delta V_{com} \quad (5)$$

It is apparent that $\Delta V_{bias}$ is independent of the varied capacitance of the liquid crystal capacitor $C_{lc}$, which means the compensation adopted in the present invention is always consistent at any gray levels. Therefore, with this implementation, the inconsistent gray level can be avoided.

Figure 7:
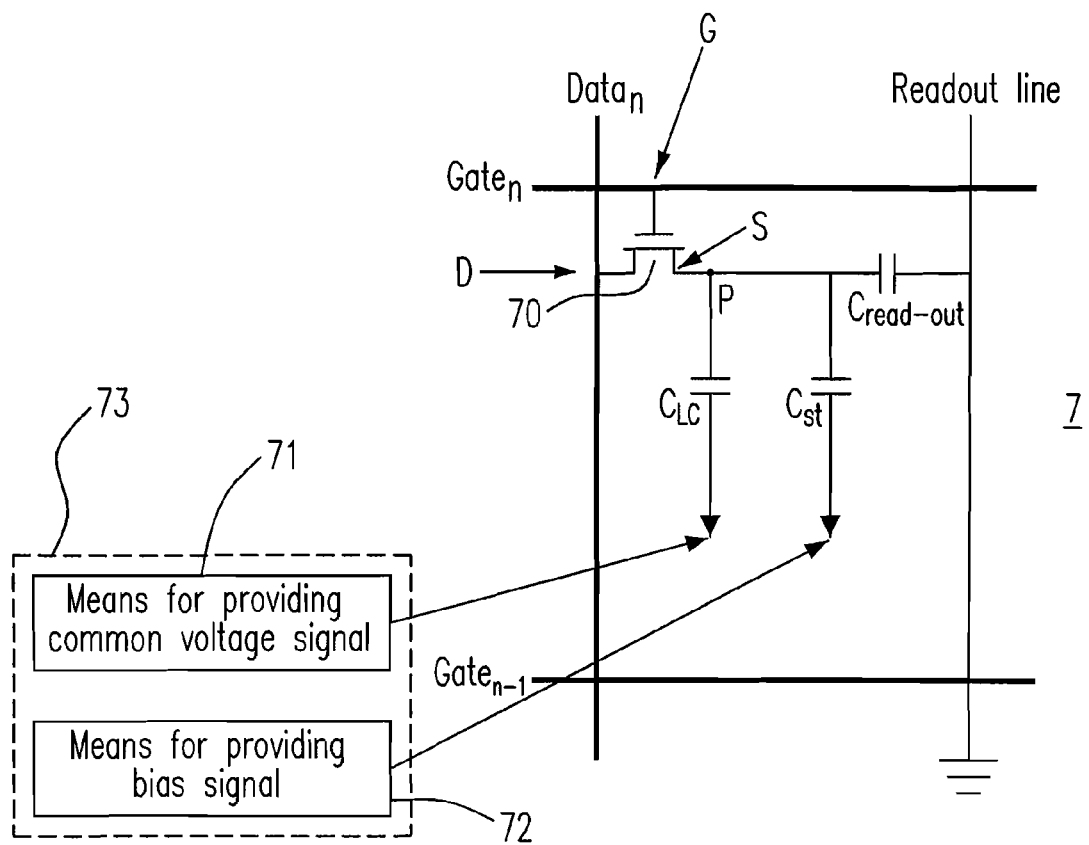
FIG. 7 is a circuit diagram showing a pixel unit of an In-Cell Touch panel according to another embodiment of the present invention.

Except for the above-mentioned pixel driving method and the liquid crystal display fabricated thereby, the present invention can further be inferred that a pixel driving device for an LCD is provided. The pixel driving device includes at least means for providing a common voltage signal to a liquid crystal capacitor of the pixel and means for providing a bias signal to a storage capacitor of the pixel, wherein the bias signal is synchronized with the common voltage signal and an amplitude of the bias signal is larger than that of the common voltage signal. As described in the aforementioned embodiments, means for providing the common voltage signal to the liquid crystal capacitor $C_{LC}$ of the pixel is exemplarily a common voltage source, such as a means 71 shown in FIG. 7 and so on. Besides, means for providing a bias signal to a storage capacitor $C_{ST}$ of the pixel is exemplarily a bias voltage source, such as a means 72 shown in FIG. 7 and so on. The means for providing the common voltage signal and the means for providing a bias signal can be integrated into a means 73 shown in FIG. 7, which can provide common voltage signal and a bias signal. The means 71, the means 72, and means 73 all can be realized by IC chips or power supply circuits.

The above-mentioned invention not only limited in In-Cell touch panel or HAR designed panel. Any display panel with significant parasitic capacitance can be decreased the gray level inconsistent by the method of this invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A driving method for a pixel unit of a liquid crystal display, the pixel unit comprising a liquid crystal capacitor including a pixel electrode with a pixel electrode voltage and a common electrode and a storage capacitor including a bias electrode and the pixel electrode having a first changing quantity of the pixel electrode voltage, comprising steps of:
   providing a common voltage signal, having a second changing quantity of a common voltage, to the common electrode; and
   providing a bias signal, having a third changing quantity of a bias voltage determined based on that the first changing quantity is equal to the second changing quantity, to the bias electrode wherein the bias signal is synchronized with the common voltage signal.

2. The driving method according to claim 1, wherein the liquid crystal display is a touch panel comprising a read-out line.

3. The driving method according to claim 1, wherein the pixel unit further comprises a switching element having a control terminal connected electrically to a first gate line, a first terminal connected electrically to a first data line, and a second terminal connected electrically to the pixel electrode.

4. The driving method according to claim 2, wherein there is an overlap portion between the pixel electrode and the readout line.

5. The driving method according to claim 3, wherein there is an overlap portion between a pixel electrode and the first gate line.

6. The driving method according to claim 3, wherein there is an overlap portion between the pixel electrode and the first data line.

7. The driving method according to claim 3, wherein there is an overlap portion between the pixel electrode and a second gate line adjacent to the first gate line.

8. The driving method according to claim 3, wherein there is an overlap portion between the pixel electrode and a second data line adjacent to the first data line.

9. A liquid crystal display comprising a plurality of pixel units, each of the pixel units comprising:
   a liquid crystal capacitor having a first terminal with a pixel electrode voltage and a second terminal, wherein the first terminal has a first changing quantity of the pixel electrode voltage, and the second terminal is connected electrically to a common voltage signal having a second changing quantity of a common voltage;
   a storage capacitor having a first terminal connected electrically to a bias signal, having a third changing Quantity of a bias voltage determined based on that the first changing quantity is equal to the second changing quantity, and a second terminal connected electrically to the first terminal of the liquid crystal capacitor; and
   wherein the bias signal is synchronized with the common voltage signal.

10. The liquid crystal display according to claim 9, wherein the liquid crystal display is a touch panel comprising a read-out line.

11. The liquid crystal display according to claim 9, wherein the pixel unit further comprises a switching element having a control terminal connected electrically to a first gate line, a first terminal connected electrically to a first data line, and a second terminal connected electrically to the second terminal of the storage capacitor and the first terminal of the liquid crystal capacitor.

12. The liquid crystal display according to claim 10, wherein there is a capacitor between a pixel electrode and the read-out line.

13. The liquid crystal display according to claim 11, wherein there is a capacitor between the first terminal of the liquid crystal capacitor and the first gate line.

14. The liquid crystal display according to claim 11, wherein there is a capacitor between the first terminal of the liquid crystal capacitor and the first data line.

15. The liquid crystal display according to claim 11, wherein there is a capacitor between the first terminal of the liquid crystal capacitor and a second gate line.

16. The liquid crystal display according to claim 11, wherein there is a capacitor between the first terminal of the liquid crystal capacitor and a second data line adjacent to the first data line.

17. A driving device for a pixel unit of a liquid crystal display, the pixel unit comprising a parasitic capacitance ($C_b$), a liquid crystal capacitor ($C_{lc}$), and a storage capacitor ($C_{st}$), comprising:
   means for providing a common voltage signal, to the liquid crystal capacitor; and
   means for providing a bias signal, to the storage capacitor, wherein the bias signal is synchronized with the common voltage signal, the amplitude of the bias signal ($\Delta V_{bias}$) is larger than that of the common voltage signal ($\Delta V_{com}$), and a relationship between the bias signal and the common voltage signal is based on $\Delta V_{bias}=[(C_{st}+C_b)/C_{st}]\cdot\Delta V_{com}$.

18. The driving device according to claim 17, wherein the liquid crystal display is a touch panel comprising a read-out line.

19. The driving device according to claim 17, wherein the pixel unit further comprises a switching element having a control terminal connected electrically to a first gate line, a first terminal connected electrically to a first data line, and a second terminal connected electrically to the storage capacitor and the liquid crystal capacitor.

20. The driving device according to claim 19, wherein there is an overlap portion between a pixel electrode and the read-out line.

21. The driving method according to claim 19, wherein there is an overlap portion between a pixel electrode and the first gate line.

22. The driving method according to claim 19, wherein there is an overlap portion between a pixel electrode and the first data line.

* * * * *